United States Patent Office 2,853,884
Patented Sept. 30, 1958

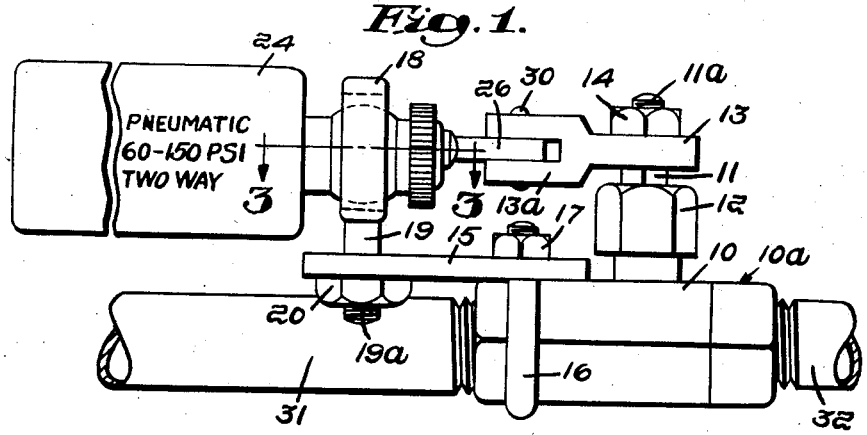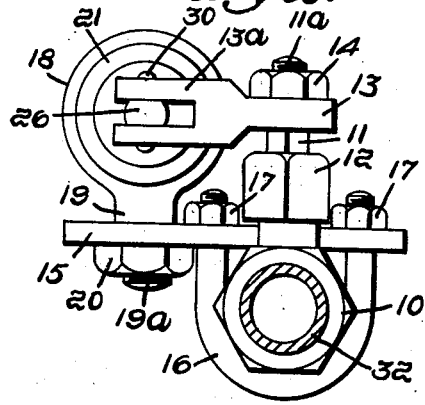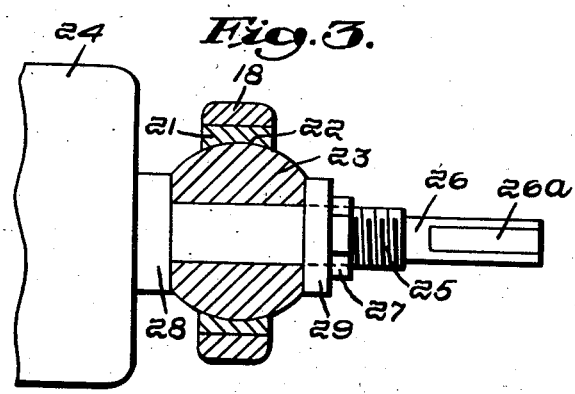

2,853,884

VALVE ACTUATING MECHANISM

Howard G. Freeman, Worcester, Mass., assignor to Jamesbury, Corp., Worcester, Mass., a corporation of Massachusetts Application December 17, 1956, Serial No. 628,876

2 Claims. (Cl. 74—105)

This invention relates to valve operating mechanisms and particularly to hydraulic or pneumatic operated mechanisms for opening and closing a ball valve in an automatic or remote control system.

Air or hydraulic cylinders have hitherto been used to operate the stem of a ball valve. In most instances, however, the cylinder is mounted either on the piping or on other frame work. This type of mounting produces a problem of initial alignment with respect to the valve itself and difficulty is also frequently encountered due to subsequent twisting of the valve or piping. Misalignment of the cylinder will cause the piston rod to bind, resulting in jamming or faulty operation of the valve. As controls of this kind are often used in hazardous or inaccessible locations, it is essential to ensure trouble-free performance of the valve mechanism.

The principal object of this invention is to provide a fluid operated valve actuating mechanism which is initially easy to install and which will withstand long periods of use under severe operating conditions. Other objects are to provide a mechanism which can be readily applied to valves of different sizes and which can be installed and dismantled with a minimum of labor. Still another object is to provide a mechanism which can be readily applied to existing valves.

The actuating mechanism is intended to be applied to a valve, for example a ball valve, of the general type having a casing with at least one flat face, for example an hexagonal casing, and a rotatable stem projecting through the flat face. The mechanism consists, in general, of a plate which is mounted on the flat face of the casing, preferably by means of a clamp bracket which passes around the casing, a ring-shaped bearing mounting which is secured to the plate, a spherical or truncated spherical bearing mounted in the ring, a hollow ball mounted on the nose of an hydraulic cylinder with the piston rod of the cylinder passing through the ball, and an arm connected to the valve stem and to the end of the piston rod. The cylinder is preferably supported by the ball and bearing in such a manner that the cylinder may rotate to accommodate the change of angle of the piston rod as the latter moves back and forth to operate the valve stem.

In the drawings illustrating the invention:

Fig. 1 is a side view of a valve with the actuating mechanism attached;

Fig. 2 is an end view of the valve and actuating mechanism; and

Fig. 3 is a fragmentary cross-section, somewhat enlarged, taken along line 3—3 of Fig. 1.

As here illustrated, the valve is of generally conventional construction and has an hexagonal casing 10, in which the ball and other operating parts are mounted, and a stem 11 projecting outward through the bonnet 12. The stem is of any suitable shape adapted to be keyed to a handle or other operating lever. For example, the stem may be square with a threaded circular upper end 11a. A lever arm 13 is provided with a square opening (not shown) which fits around the square part of the stem and is secured to the stem by means of a nut 14 engaging the threaded end 11a. The arm has a forked end 13a.

A flat plate 15 is mounted on the face 10a of the casing and is secured by a U-shaped clamp bracket 16 held in place by nuts 17. It is understood that the exact shape of the plate is immaterial as long as it has a flat under surface for engagement with face 10a. Mounted on the plate is a ring-shaped bearing block or pillow block 18. This block has a shouldered neck 19 which bears on the upper side of plate 15 and has a threaded portion 19a which projects through the plate and engages a nut 20. Mounted in the bearing block 18 is a bushing 21 having a spherical or partially spherical socket 22. A ball 23 is mounted to rotate in this socket. The hydraulic cylinder 24 has a tubular mounting stud 25 through which the piston rod 26 passes. The mounting stud passes through the ball 23 and is secured by means of a nut 27. Spacing collars 28 and 29 may be employed, as required, on either side of the ball. The end of the piston rod 26 has flats 26a and the flatted portion of the rod is received in hte forked end 13a of arm 13. The piston rod and the arm are pivotally connected together by means of a pin or bolt 30.

The casing 10 of the valve is internally threaded at either end and is assembled in the customary manner by screwing on to pipes 31 and 32 which may be part of any piping system to be controlled. It will be noted that the cylinder 24 and the associated mechanism for operating the valve stem are mounted entirely on the valve casing so that the valve and actuating mechanism may be preassembled and installed as a unit in any desired piping system, without reference to the support of the piping system. The valve and its actuating mechanism may thus be accurately aligned at the factory and danger of faulty alignment upon installation is eliminated. As the actuating mechanism is firmly secured to the valve casing, the cylinder will not be moved out of alignment by vibration, thermal expansion, or other conditions to which the piping system may be subjected. The actuating mechanism may, nevertheless, be readily dismantled for servicing. For example, in order to repack the stem of the valve, the actuating mechanism may be removed by loosening nuts 17, taking off bracket 16, and then disconnecting arm 13 from the stem by removing nut 14. The actuating mechanism may then be lifted off. Proper realignment is assured when the mechanism is replaced because the cylinder remains mounted on the plate 15.

What is claimed is:

1. A valve actuating mechanism for a valve, having a casing and a stem projecting through the casing and adapted to be turned to open and close the valve, comprising: a bearing member fixed on said casing and having a socket substantially in the form of a truncated sphere; a fluid operated cylinder having a mounting member and a piston rod projecting through said mounting member, a generally spherical member mounted on said mounting member and rotatably seated in said socket, said mounting member and socket constituting the sole support for said cylinder and an arm fixedly connected to said stem and pivotally connected to said rod.

2. A valve actuating mechanism for a valve having a casing with a flat face and a stem projecting through said face adapted to be turned to open and close the valve, comprising: a plate mounted on said flat face, means securing said plate to said casing; a bearing member fixed to said plate and having a socket substantially in the form of a truncated sphere; a fluid operated cylinder having a mounting member and a piston rod projecting through said mounting member, a generally spherical member mounted on said mounting member and rotatably seated in said socket, said mounting member and socket constituting the sole support for said cylinder; and an arm fixedly connected to said stem and pivotally connected to said rod.

References Cited in the file of this patent

UNITED STATES PATENTS

| | | |
|---|---|---|
| 1,983,368 | Hathorn | Dec. 4, 1934 |
| 2,386,589 | Caldwell | Oct. 9, 1945 |
| 2,464,873 | Lear | Mar. 22, 1949 |
| 2,575,964 | MacLean | Nov. 20, 1951 |
| 2,798,688 | Affleck | July 9, 1957 |